United States Patent
Yang

(10) Patent No.: US 10,208,881 B2
(45) Date of Patent: Feb. 19, 2019

(54) WATER-SAVING SHEET AND WATER-SAVING DEVICE HAVING THE SAME

(71) Applicant: Tsai-Chen Yang, Taichung (TW)

(72) Inventor: Tsai-Chen Yang, Taichung (TW)

( * ) Notice: Subject to any disclaimer, the term of this patent is extended or adjusted under 35 U.S.C. 154(b) by 0 days.

(21) Appl. No.: 15/971,162

(22) Filed: May 4, 2018

(65) Prior Publication Data

US 2018/0252351 A1    Sep. 6, 2018

Related U.S. Application Data

(63) Continuation-in-part of application No. 15/097,537, filed on Apr. 13, 2016, now abandoned.

(51) Int. Cl.
| | |
|---|---|
| *F16L 55/027* | (2006.01) |
| *B05B 1/30* | (2006.01) |
| *E03C 1/02* | (2006.01) |
| *F16L 55/07* | (2006.01) |

(52) U.S. Cl.
CPC .......... *F16L 55/02718* (2013.01); *B05B 1/30* (2013.01); *F16L 55/07* (2013.01); *E03C 2001/026* (2013.01)

(58) Field of Classification Search
CPC ...... F16L 55/07; F16L 55/02718; B05B 1/30; E03C 2001/026
USPC .................................................... 138/43, 46
See application file for complete search history.

(56) References Cited

U.S. PATENT DOCUMENTS

| | | | | |
|---|---|---|---|---|
| 2,275,627 | A * | 3/1942 | Hartmann | F04F 5/464 137/516.19 |
| 3,216,451 | A | 11/1965 | Smallpeice | |
| 4,000,857 | A | 1/1977 | Moen | |
| 4,221,335 | A * | 9/1980 | Shames | B05B 1/18 239/428.5 |
| 4,480,784 | A * | 11/1984 | Bennett | G05D 23/025 137/457 |
| 4,562,960 | A * | 1/1986 | Marty | E03C 1/084 138/45 |
| 6,571,831 | B1 * | 6/2003 | Hart | G05D 7/012 138/45 |
| 8,230,884 | B2 * | 7/2012 | Bereznai | F16K 21/02 137/860 |

(Continued)

*Primary Examiner* — Craig M Schneider
*Assistant Examiner* — David R Deal
(74) *Attorney, Agent, or Firm* — Muncy, Geissler, Olds & Lowe, P.C.

(57) ABSTRACT

A water-saving sheet and a water-saving device having the same is provided. The water-saving sheet includes a sheet body including a central assembling base and a plurality of through holes arranged around the central assembling base. A circumference of the sheet body has an engaging flange structure for being positionably engaged with an inner wall of a tube. An elastic ring is annularly arranged on the central assembling base. The elastic ring and the central assembling base form at least one first passage therebetween, the elastic ring and each said through hole form a second passage therebetween. The water-saving device includes one said water-saving sheet and a barrel member. An inner wall of the barrel member has a shoulder portion engageable with the engaging flange structure to restrict the sheet body from moving toward and out from the inlet end.

10 Claims, 7 Drawing Sheets

(56) References Cited

U.S. PATENT DOCUMENTS

| | | | | |
|---|---|---|---|---|
| 8,701,715 B1* | 4/2014 | Crompton | ............... | F16K 17/34 |
| | | | | 137/460 |
| 2002/0074049 A1* | 6/2002 | Jiang | ....................... | F16K 47/10 |
| | | | | 138/46 |
| 2003/0209278 A1* | 11/2003 | Sochtig | .................. | G05D 7/012 |
| | | | | 138/43 |
| 2008/0277010 A1* | 11/2008 | Zoller | .................... | G05D 7/012 |
| | | | | 138/43 |
| 2011/0247702 A1 | 10/2011 | Wildfang | | |
| 2012/0247588 A1* | 10/2012 | Yang | ......................... | E03C 1/08 |
| | | | | 137/560 |
| 2013/0025719 A1* | 1/2013 | Yang | ....................... | F15D 1/025 |
| | | | | 137/599.01 |
| 2014/0110005 A1* | 4/2014 | Ho | ......................... | G05D 7/012 |
| | | | | 138/43 |

* cited by examiner

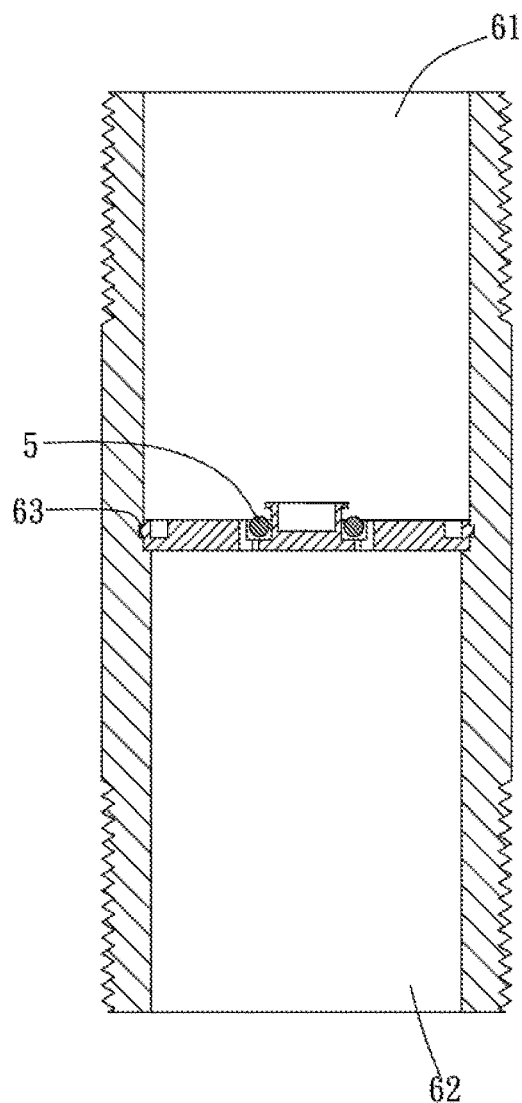
FIG. 5
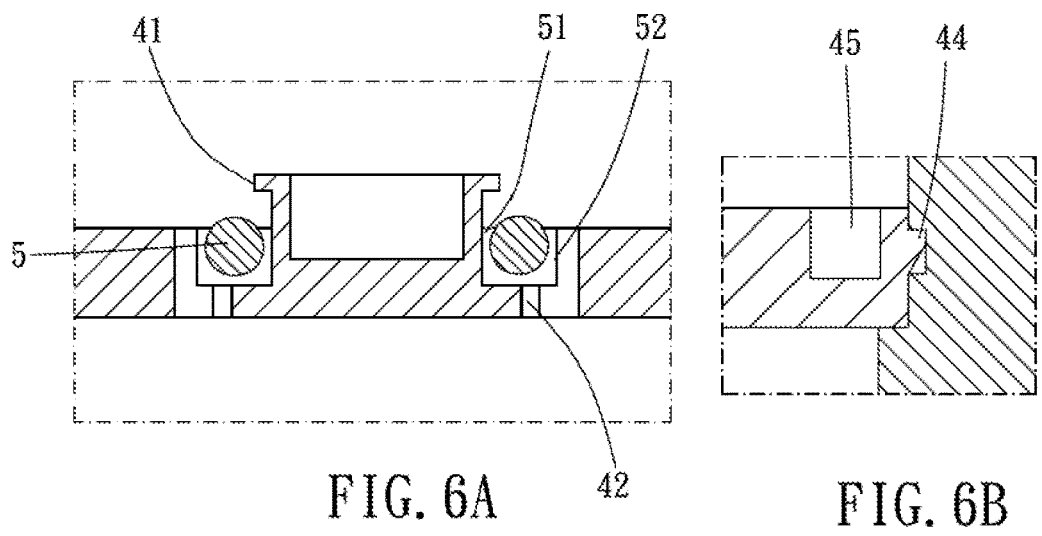
FIG. 6A
FIG. 6B

WATER-SAVING SHEET AND WATER-SAVING DEVICE HAVING THE SAME

The present invention is a CIP of application Ser. No. 15/097,537, filed Apr. 13, 2016, the entire contents of which are hereby incorporated by reference.

BACKGROUND OF THE INVENTION

Field of the Invention
Description of the Prior Art

A common water-saving sheet can lessen a water flow through decreasing a total cross-sectional area of a tube so as to save water.

However, when a hydraulic pressure is small, the conventional water-saving sheet still blocks the water flow and cannot adjust the water flow according to the hydraulic pressure. In addition, the water-saving sheet is fixed in the tube through abutting against the tube radially, and the water-saving sheet falls off easily.

US patent publication 2011/0247702 disclosed a water-saving sheet having a sealing ring covering the sheet. The sealing ring is made of resilient material to make the sheet abut the inner wall of the tube firmly. However, the elasticity is limited because it's completely provided by the resilience of the material.

U.S. Pat. No. 4,000,857 disclosed another water-saving sheet. The sheet is clamped by two tube units screwed with each other, so the sheet is firmly positioned. However, the sheet can not be used in a single tube structure.

The present invention has arisen to mitigate and/or obviate the afore-described disadvantages.

SUMMARY OF THE INVENTION

The major object of the present invention is to provide a water-saving sheet and a water-saving device having the same, which can adjust a water flow appropriately according to a hydraulic pressure.

To achieve the above and other objects, a water-saving sheet is provided, including: a sheet body, including a central assembling base and a plurality of through holes arranged around the central assembling base, a circumference of the sheet body radially protruding outward to form an engaging flange structure and having a material-reduced structure near the engaging flange structure, the engaging flange structure for being positionably engaged with an inner wall of a tube; an elastic ring, annularly arranged on the central assembling base and being at least partially located correspondingly above the plurality of through holes, the elastic ring and the central assembling base forming at least one first passage therebetween which is communicable with the plurality of through holes, the elastic ring and each said through hole forming a second passage therebetween which communicates with each said through hole. The material-reduced structure is an annular groove. The annular groove has an inner fringe and an outer fringe. The inner fringe is closer to the a center of the sheet body than the outer fringe is. A distance between the circumference of the sheet body and the inner fringe of the annular groove is defined as D1, A distance between the circumference of the sheet body and the center of the sheet body is defined as D2. D2 is more than six times D1. A radial width of the annular groove is defined as W1. W1 is 0.5-0.80 time D1. The through holes are surrounded by the inner fringe of the annular groove.

To achieve the above and other objects, a water-saving device is further provided, including: one said water-saving sheet; and a barrel member, including an inlet end, an outlet end and a shoulder portion arranged on the inner wall of the barrel member, the shoulder portion being engageable with the engaging flange structure to restrict the sheet body from moving toward and out from the inlet end.

The present invention will become more obvious from the following description when taken in connection with the accompanying drawings, which show, for purpose of illustrations only, the preferred embodiment(s) in accordance with the present invention.

BRIEF DESCRIPTION OF THE DRAWINGS

FIG. 5 is a cross-sectional view of the first embodiment of the present invention;

FIGS. 6A and 6B are partially-enlarged views of FIG. 5;

DETAILED DESCRIPTION OF THE PREFERRED EMBODIMENTS

Figure 1:
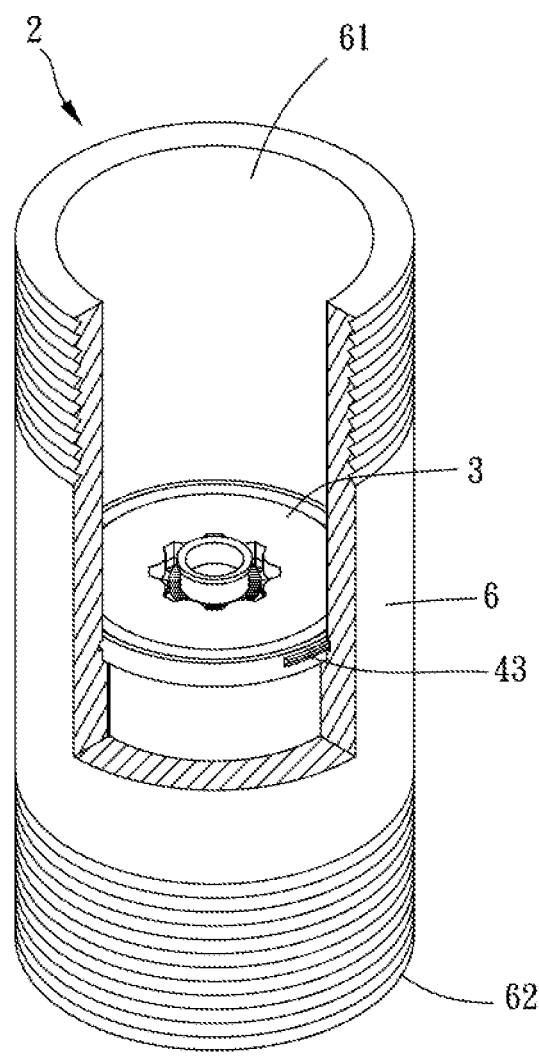
FIG. 1 is a perspective view of a first embodiment of the present invention.
Figure 2:
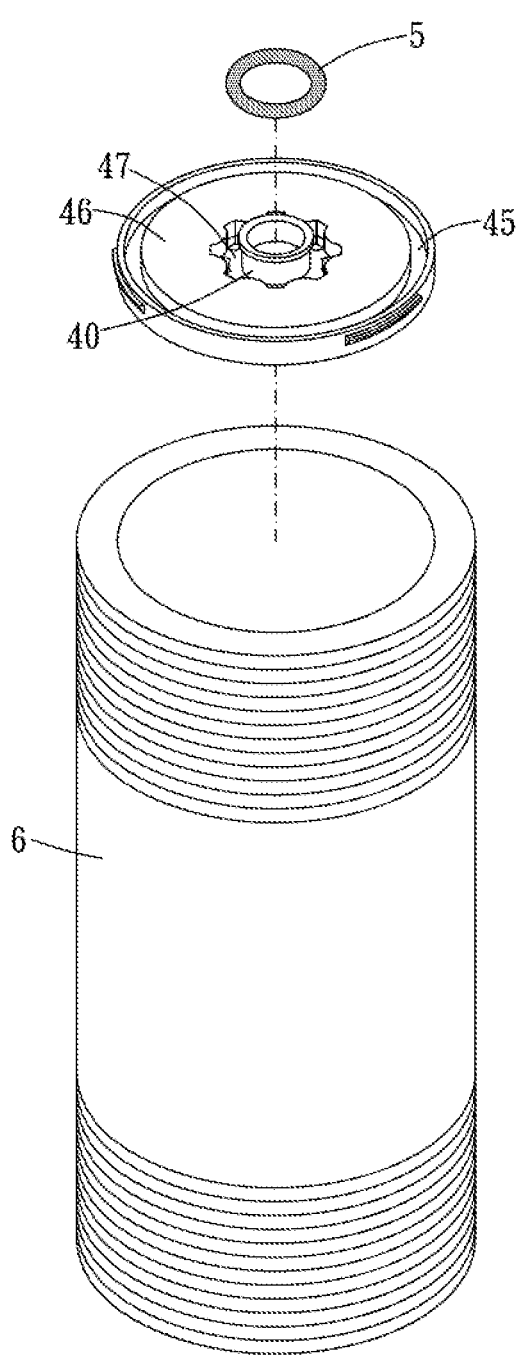
FIG. 2 is a breakdown view of the first embodiment of the present invention.
Figure 3:
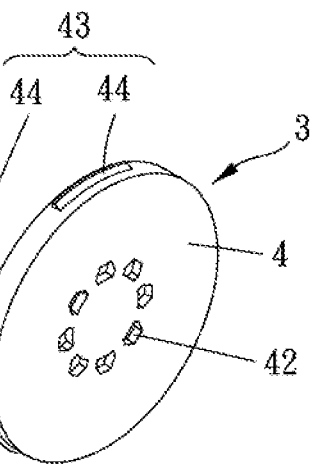
FIGS. 3 and 4 are drawings showing a water-saving sheet of the first embodiment of the present invention.
Figure 4:
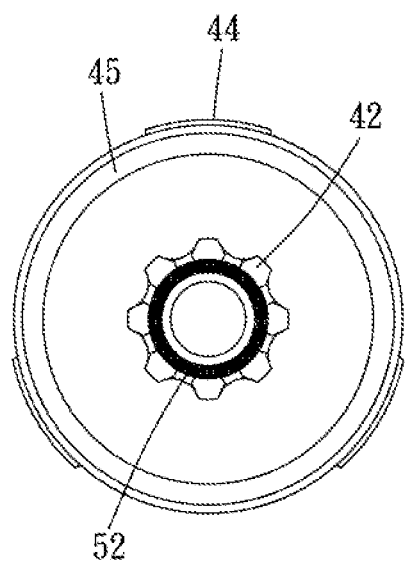
Figure 7:
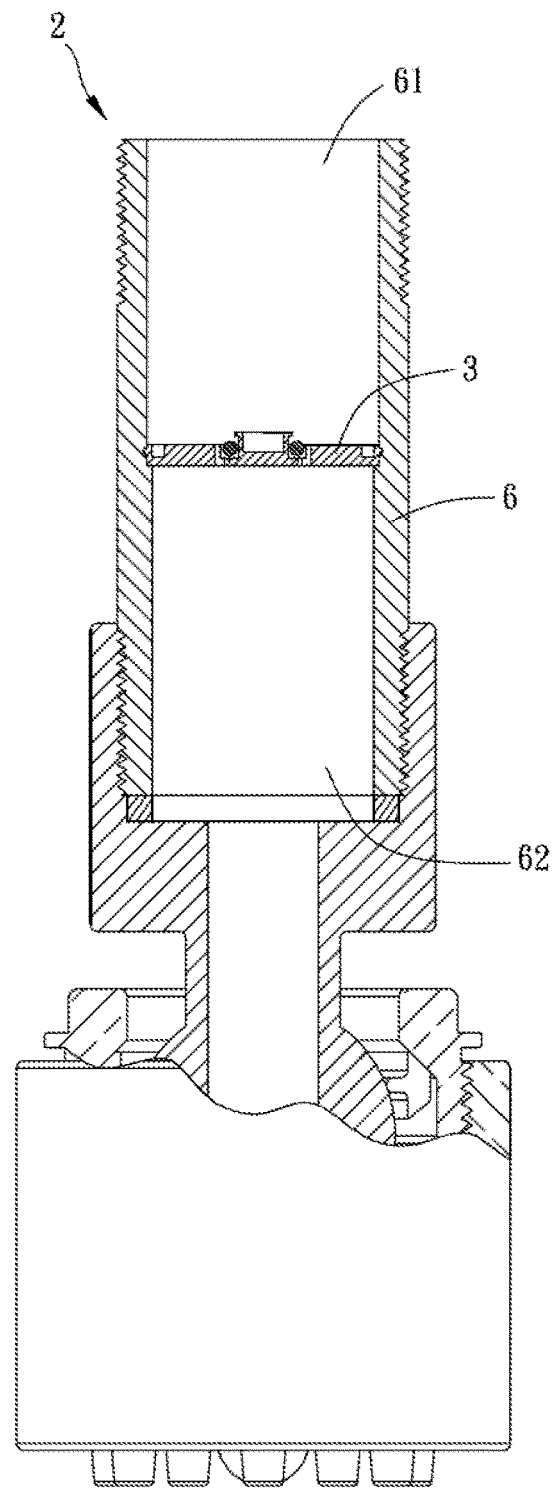
FIG. 7 is a drawing showing the first embodiment of the present invention in application.
Figure 8:
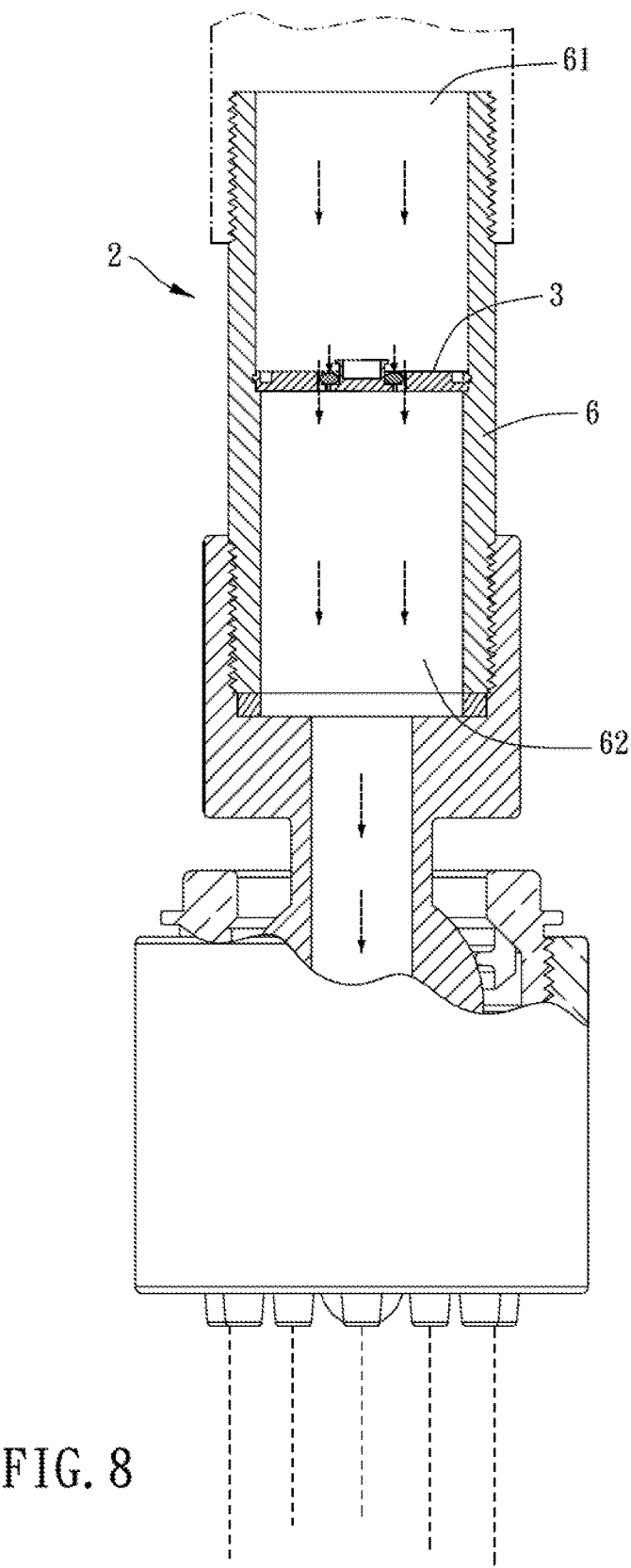
FIG. 8 is a drawing showing the first embodiment of the present invention in operation.

The present invention will be clearer from the following description when viewed together with the accompanying drawings, which show, for purpose of illustrations only, the preferred embodiment in accordance with the present invention.

Please refer FIGS. 1 to 8 for a first embodiment of the present invention. A water-saving sheet 3 includes a sheet body 4 and an elastic ring 5. The sheet body 4 includes a central assembling base 40 and a plurality of through holes 42 arranged around the central assembling base 40, a circumference of the sheet body 4 radially protrudes outward to form an engaging flange structure 43 and has a material-reduced structure 45 near the engaging flange structure 43, the engaging flange structure 43 is for being positionably engaged with an inner wall of a tube, and the material-reduced structure 45 allows the engaging flange structure 43 to be deformed so that the sheet body 4 can come into the tube. The elastic ring 5 is annularly arranged on the central assembling base 40 and is at least partially located correspondingly above the plurality of through holes 42, the elastic ring 5 and the central assembling base 40 form at least one first passage 51 therebetween which is communicable with the plurality of through holes 42, and the elastic ring 5 and each said through hole 42 form a second passage 52 therebetween which communicates with each said through hole 42. When a hydraulic pressure is high, the elastic ring 5 is for being deformed to cover the plurality of through holes 42 to lessen a water flow; and when the hydraulic pressure is low, the first passage 51 and each said second passage 52 are for making a liquid flow smoothly.

In the first embodiment, the sheet body 4 further includes a round board 46, and the central assembling base 40 is protrudingly disposed on the round board 46. The central assembling base 40 is hollow and a distal end thereof protrudes radially to form a blocking flange 41, the elastic ring 5 is located between the blocking flange 41 and the round board 46 and is axially movable, and the blocking flange 41 can prevent the elastic ring 5 from falling off. The round board 46 has an annular recess 47 which surrounds the central assembling base 40 and communicates with the plurality of through holes 42, a contour of the annular recess 47 is substantially gear-shaped, and the elastic ring 5 is located in the annular recess 47. It is understandable that a part of the annular recess can be viewed as a part of each said through hole.

Each said through hole 42 is a polygonal hole which is radially tapered outward. Specifically, each said through hole 42 is a hexagonal hole, and each said hexagonal hole overlaps with a part of the contour of the annular recess 47; therefore, when the hydraulic pressure is extremely high, each said through hole 42 is not covered by the elastic ring 5 completely to keep the water-saving sheet 3 function normally. The at least one first passage 51 is an annular passage which surrounds the central assembling base 40, and the annular passage is smaller than the plurality of second passages 52 in total cross-sectional area. When the hydraulic pressure is high, the elastic ring 5 is deformed, a communication between the first passage 51 and each said through hole 42 is blocked, each said second passage 52 is filled up by the elastic ring 5, and an area of each said through hole 42 covered by the elastic ring 5 increases; and when the hydraulic pressure is low, the elastic ring 5 radially floats toward the blocking flange 41 so as not to hinder the water flow.

The material-reduced structure 45 is an annular groove. As viewed along an axial direction, the first passage 51 and the plurality of second passages 52 are located at two opposite sides of the elastic ring 5 respectively. The engaging flange structure 43 includes three wedge protrusions 44 equiangularly and radially arranged relative to the annular groove, and the wedge protrusions 44 are for positionably engaged with a tube. Preferably, the annular groove has an inner fringe and an outer fringe. The inner fringe is closer to a center of the sheet body 4 than the outer fringe is. A distance between the circumference of the sheet body 4 and the inner fringe of the annular groove is defined as D1. A distance between the circumference of the sheet body 4 and the center of the sheet body 4 is defined as D2, D2 is more than six times D1. A radial width of the annular groove is defined as W1. W1 is 0.5-0.80 time D1. The through holes 42 are surrounded by the inner fringe of the annular groove.

Figure 9:
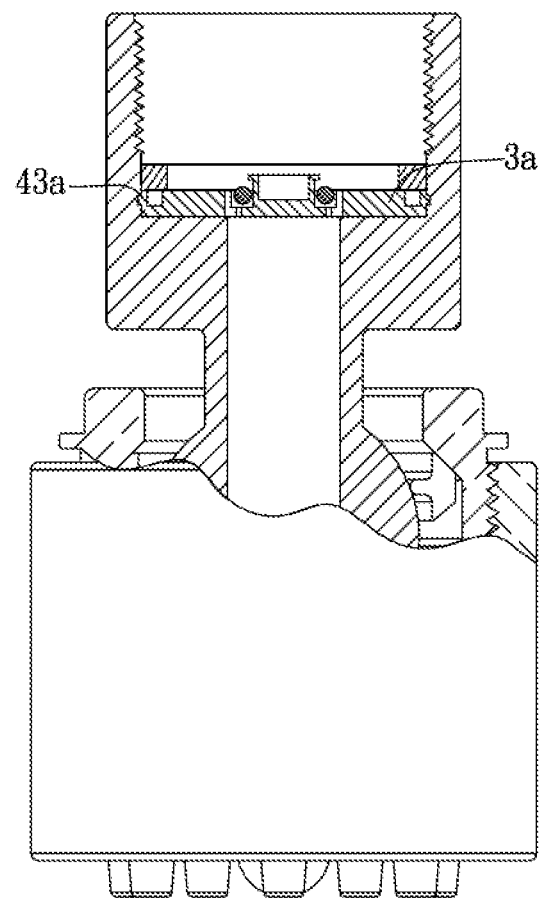
FIG. 9 is a drawing showing a second embodiment of the present invention in application.

Please refer to FIG. 9 for a second embodiment, a water-saving sheet 3a can be engaged with a tube via an engaging flange structure 43a.

Figure 10:
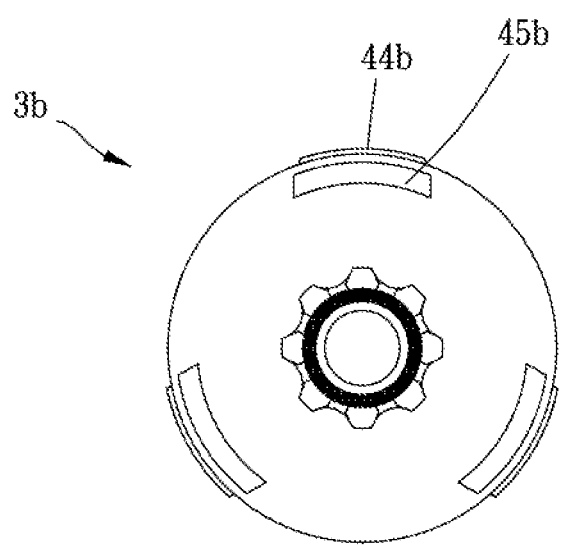
FIG. 10 is a drawing showing a water-saving sheet of a third embodiment of the present invention.

Please refer to FIG. 10 for a third embodiment, a material-reduced structure 45b of a water-saving sheet 3b may include a plurality of grooves, and each groove corresponds to respective one of wedge protrusions 44b (as shown in FIG. 10).

In other embodiments, the central assembling base of water-saving sheet may be a solid structure; the central assembling base of water-saving sheet may annularly has at least one groove, and the at least one groove communicates with the first passage of the water-saving sheet; the plurality of through holes of the water-saving sheet may be round or polygonal (for example, pentagonal, but not limited thereto); the water-saving sheet may not include a central assembling base, and instead, the round board extends axially to form a plurality of annular hooks for positioning the elastic ring; two sides of the material-reduced structure of the water-saving sheet may be a curved and dented configuration or a structure with a thickness decreases gradually from a center radially outward; the engaging flange structure of the water-saving sheet may be a wedge protrusion which is continuous or may include more than one wedge protrusion (for example, five, but not limited thereto) as long as the water-saving sheet can be fixed in a barrel member; and the elastic ring of the water-saving sheet may be greater than, equal to or smaller than each said through hole in radial dimension. The water-saving sheet may not include the annular recess as long as the elastic ring can be deformed appropriately according to the hydraulic pressure to cover each said through hole.

Please refer to FIGS. 1 to 8 for a water-saving device 2 of the present invention. The water-saving device 2 includes the water-saving sheet 3 mentioned above and a barrel member 6, the barrel member 6 includes an inlet end 61, an outlet end 62 and a shoulder portion 63 arranged on the inner wall of the barrel member 6, the shoulder portion 63 is engageable with the engaging flange structure 43 to restrict the sheet body 4 from moving toward and out from the inlet end 61. Thereby, the water-saving device 2 can be connected to a tube to save water effectively.

In other embodiments, the engaging flange structure of the water-saving sheet may be a groove arranged annularly and radially and is engageable with the wedge protrusion arranged annularly on the inner wall of the water-saving device.

Given the above, the first and second passages located at two opposite sides of the elastic ring respectively can be filled up by the elastic ring which can be deformed appropriately according to the hydraulic pressure, the elastic ring covers the through holes appropriately to control the water flow, the annular recess communicates with each said through hole normally so that the through holes can keep the water flow flowing stably normally, and the engaging flange structure makes the sheet body be stably abutted against the barrel member so that the water-saving sheet will not fall off easily.

While we have shown and described various embodiments in accordance with the present invention, it should be clear to those skilled in the art that further embodiments may be made without departing from the scope of the present invention.

What is claimed is:

1. A water-saving sheet, including:
a sheet body, including a central assembling base and a plurality of through holes arranged around the central assembling base, a circumference of the sheet body radially protruding outward to form an engaging flange structure and having a material-reduced structure near the engaging flange structure, the engaging flange structure for being positionably engaged with an inner wall of a tube;
an elastic ring, annularly arranged on the central assembling base and being at least partially located correspondingly above the plurality of through holes, the elastic ring and the central assembling base forming at least one first passage therebetween which is communicable with the plurality of through holes, the elastic ring and each said through hole forming a second passage therebetween which communicates with each said through hole;

wherein the engaging flange structure includes three wedge-shaped protrusions arranged equiangularly and spacedly, each protrusion has a top face and a bottom face, the top face is substantially parallel to a radial direction of the sheet body, the bottom face is unparallel to the top face and faces outward;

wherein the material-reduced structure is an annular groove, the annular groove has an inner fringe and an outer fringe, the inner fringe is closer to a center of the sheet body than the outer fringe is, a distance between the circumference of the sheet body and the inner fringe of the annular groove is defined as D1, a distance between the circumference of the sheet body and the center of the sheet body is defined as D2, D2 is more than six times D1, a radial width of the annular groove is defined as W1, W1 is 0.5-0.80 times D1, the through holes are surrounded by the inner fringe of the annular groove.

2. The water-saving sheet of claim 1, wherein the sheet body further includes a round board, and the central assembling base is protrudingly disposed on the round board.

3. The water-saving sheet of claim 2, wherein the central assembling base is hollow and a distal end thereof protrudes radially to form a blocking flange, and the elastic ring is located between the blocking flange and the round board.

4. The water-saving sheet of claim 3, wherein the round board perpendicularly has an annular recess which surrounds the central assembling base and communicates with the plurality of through holes, a contour of the annular recess is substantially gear-shaped, the elastic ring is located in the annular recess; each said through hole is substantially a hexagonal hole which is radially tapered outward, each said hexagonal hole overlaps with a part of the contour of the annular recess; the at least one first passage is an annular passage which surrounds the central assembling base, the annular passage is smaller than the plurality of second passages in total cross-sectional area; the material-reduced structure is an annular groove; the elastic ring is smaller than each said through hole in radial dimension, as viewed along an axial direction, the annular passage and the plurality of second passages are located at two opposite sides of the elastic ring respectively.

5. The water-saving sheet of claim 2, wherein the round board has an annular recess which surrounds the central assembling base and communicates with the plurality of through holes, a contour of the annular recess is substantially gear-shaped, and the elastic ring is located in the annular recess.

6. The water-saving sheet of claim 1, wherein each said through hole is a polygonal hole which is radially tapered outward.

7. The water-saving sheet of claim 1, wherein the at least one first passage is smaller than the plurality of second passages in total cross-sectional area.

8. The water-saving sheet of claim 1, wherein the material-reduced structure is a groove.

9. The water-saving sheet of claim 1, wherein the elastic ring is smaller than each said through hole in radial dimension, and as viewed along an axial direction, the at least one first passage and the plurality of second passages are located at two opposite sides of the elastic ring respectively.

10. A water-saving device, including the water-saving sheet of claim 1, further including:
a barrel member, including an inlet end, an outlet end and a shoulder portion arranged on an inner wall of the barrel member, the shoulder portion being engageable with the engaging flange structure to restrict the sheet body from moving toward and out from the inlet end.

\* \* \* \* \*